United States Patent
Wang (10) Patent No.: US 10,046,597 B2
(45) Date of Patent: *Aug. 14, 2018

(54) AUTOMOBILE WHEEL COVER

(71) Applicant: Yen-Ching Wang, Kaohsiung (TW)

(72) Inventor: Yen-Ching Wang, Kaohsiung (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/256,614

(22) Filed: Sep. 4, 2016

(65) Prior Publication Data

US 2018/0065408 A1   Mar. 8, 2018

(51) Int. Cl.
| | | |
|---|---|---|
| *B60B 7/06* | (2006.01) | |
| *B60B 7/04* | (2006.01) | |
| *B60B 7/14* | (2006.01) | |

(52) U.S. Cl.
CPC .............. *B60B 7/04* (2013.01); *B60B 7/06* (2013.01); *B60B 7/14* (2013.01); *B60B 2900/351* (2013.01)

(58) Field of Classification Search
CPC .... B60B 7/00; B60B 7/04; B60B 7/06; B60B 7/061; B60B 7/08
See application file for complete search history.

(56) References Cited

U.S. PATENT DOCUMENTS

| | | | | |
|---|---|---|---|---|
| 4,929,030 A | * | 5/1990 | Park | B60B 7/20 301/37.101 |
| 5,090,777 A | * | 2/1992 | Li | B60B 7/04 301/37.371 |
| 6,045,195 A | * | 4/2000 | Okamoto | B60B 7/20 301/37.108 |
| 9,821,599 B2 | * | 11/2017 | Wang | B60B 7/08 |

FOREIGN PATENT DOCUMENTS

| | | |
|---|---|---|
| TW | M262380 | 4/2005 |
| TW | M271743 | 8/2005 |
| TW | M394921 | 12/2010 |
| TW | M522868 | 6/2016 |

* cited by examiner

*Primary Examiner* — Jason R Bellinger
(74) *Attorney, Agent, or Firm* — Raymond Y. Chan; David and Raymond Patent Firm (57) ABSTRACT

An automobile wheel cover includes a central hole and a bearing seat, an annular seat with a plurality of slots, an elastic post provided between each two slots, and an adjusting block which includes a first end and a second end which is larger in diameter than the first end, the first end is inserted in the annular seat. The adjusting block includes a recess and has the first end inserted in the annular seat, a screw horizontally extends outward from the first end of the adjusting block and is inserted into the bearing seat, at least one nut is screwed on the screw and abutted against an outer surface of the bearing seat, rotating the nut can make the second end of the adjusting block move toward an interior of the annular seat, and the posts expand outwardly.

6 Claims, 8 Drawing Sheets

AUTOMOBILE WHEEL COVER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an automobile wheel cover, and more particularly to an automobile wheel cover which can be adjusted to fit various automobile rims with different hole diameters, and does not interfere with the wheel shaft.

Description of Related Arts

The current automobile wheel cover is usually provided with a plurality of engaging legs (such as, metal engaging legs or plastic engaging legs) in a periphery of an inner surface thereof for engaging in a plurality of holes in the automobile rim (such as, the structures disclosed in Taiwan Patent Publication Nos. M262380, M271743, M394921, and automobile rims in the industry also known as automobile steel rims), however, in practice, no matter what kind of engaging leg is used, the wheel cover cannot be fitted tightly since the shapes of the holes of the automobile rims of different brands have some dimensional tolerances. Although the user cannot see the sealing defect from the appearance, when driving at high speed on an uneven road, the wheel cover will be likely to fall from the automobile, which is insecure. In addition, in a center of an automobile rim is defined a shaft hole, a plurality of engaging legs of a cover with a brand is engaged in the shaft hole, if an automobile wheel cover is assembled to the automobile rim, the wheel cover will cover the cover.

Therefore, the inventor of the present invention has invented a wheel cover structure which got patented in Taiwan with the patent No. M522868 and is capable of overcoming the aforementioned disadvantages. However, the adjusting block is solid and will interfere with the wheel shaft of some branded cars, and as a result, the wheel cover might fall from the wheel when the car is driving, so there is a need for improvement.

The present invention has arisen to mitigate and/or obviate the afore-described disadvantages.

SUMMARY OF THE PRESENT INVENTION

The present invention is aimed at providing an automobile wheel cover which is capable of overcoming the abovementioned defects.

Therefore, an automobile wheel cover in accordance with the present invention comprises a central hole and is integrally formed with a bearing seat opposite an inner side of the central hole, an annular seat extended from an inner side of the bearing seat and defined with a plurality of slots, an elastic post provided between each two slots. An adjusting block includes a first end and a second end which has a diameter larger than a diameter of the first end, the first end is inserted in the annular seat. The automobile wheel cover is characterized in that: the adjusting block is defined with a recess which opens toward the second end, and has the first end inserted in the annular seat, a screw horizontally extends outward from the first end of the adjusting block and is inserted into the bearing seat, at least one nut is screwed on the screw and abutted against an outer surface of the bearing seat, rotating the nut can make the second end of the adjusting block move toward an interior of the annular seat, and the posts expand outwardly. Thereby, when the annular seat of the automobile wheel cover is inserted in a shaft hole of an automobile rim, and the screw is threaded to make the posts expanded outwardly and abutted against the shaft hole, the automobile wheel cover can be assembled to the automobile rim stably. The recess prevents interference of the adjusting blocks with the wheel shaft.

A lateral side of the adjusting block is defined with at least one engaging portion for engaging in the slot, so as to fix the adjusting block when rotating the nut.

Between the bearing seat and an inner periphery of the central hole is equidistantly defined a plurality of separating holes, a cover is inserted in the central hole and is equidistantly and annularly provided in an inner side thereof with a plurality of engaging legs, each of the engaging legs is provided at the front end thereof with an engaging section, the engaging legs are inserted through the separating holes, and have the engaging sections engaged in the slots, such that the cover will be assembled in the central hole of the automobile wheel cover.

A protruded ring is inwardly extended from an inner side of the central hole, a plurality of protruded seats is outwardly extended from an outer side of the bearing seat and is connected to the protruded ring, such that the separating holes are formed between the protruded seats, the engaging legs are inserted through the separating holes, and have the engaging sections engaged in the protruded ring.

The elastic posts are located around an inner peripheral edge of the protruded ring, and the protruded seats extend toward the inner side of the central hole to connect the elastic posts.

The bearing seat is further provided with an inserting hole for insertion of the screw, and a plurality of arc-shaped grooves formed around an outer periphery of the inserting hole, a plurality of arc-shaped protrusions is formed around an inner periphery of the nut, the nut is screwed with the screw and abutted against the outer surface of the bearing seat, the arc-shaped protrusions are engaged in the arc-shaped grooves.

In summary, the second end of the adjusting block is provided with the recess for accommodation of the outer end of the wheel shaft, the adjusting block is inserted in the annular seat via the first end, and the screw which horizontally extends outward from the first end is threaded in the adjusting block and fixed to the bearing seat by a nut. The automobile wheel cover can be adjusted to fit various automobile rims with different hole diameters, and does not interfere with the wheel shaft.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION OF THE PREFERRED EMBODIMENT

The present invention will be clearer from the following description when viewed together with the accompanying drawings, which show, for purpose of illustrations only, the preferred embodiment in accordance with the present invention.

Figure 1:
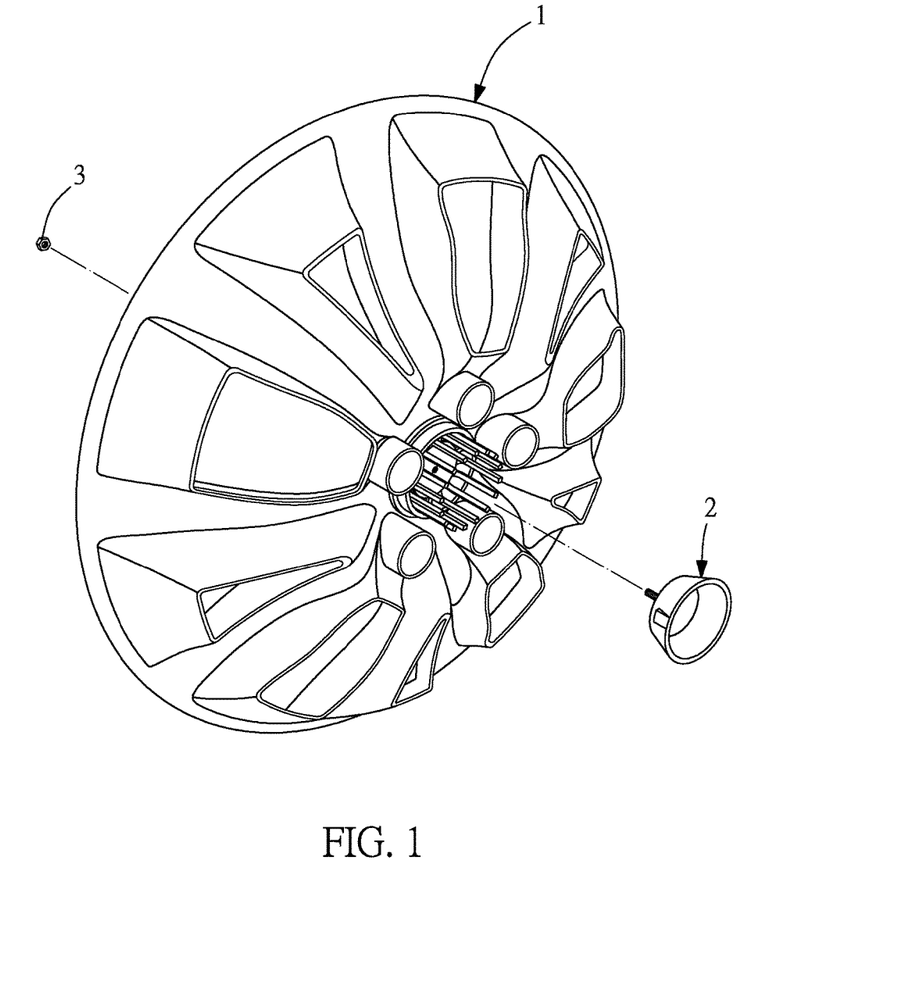
FIG. 1 is an exploded view of conventional automobile rim and cover.

Referring to FIG. 1, an automobile wheel cover 1 in accordance with the present invention comprises an adjusting block 2 and a nut 3.

Figure 2:
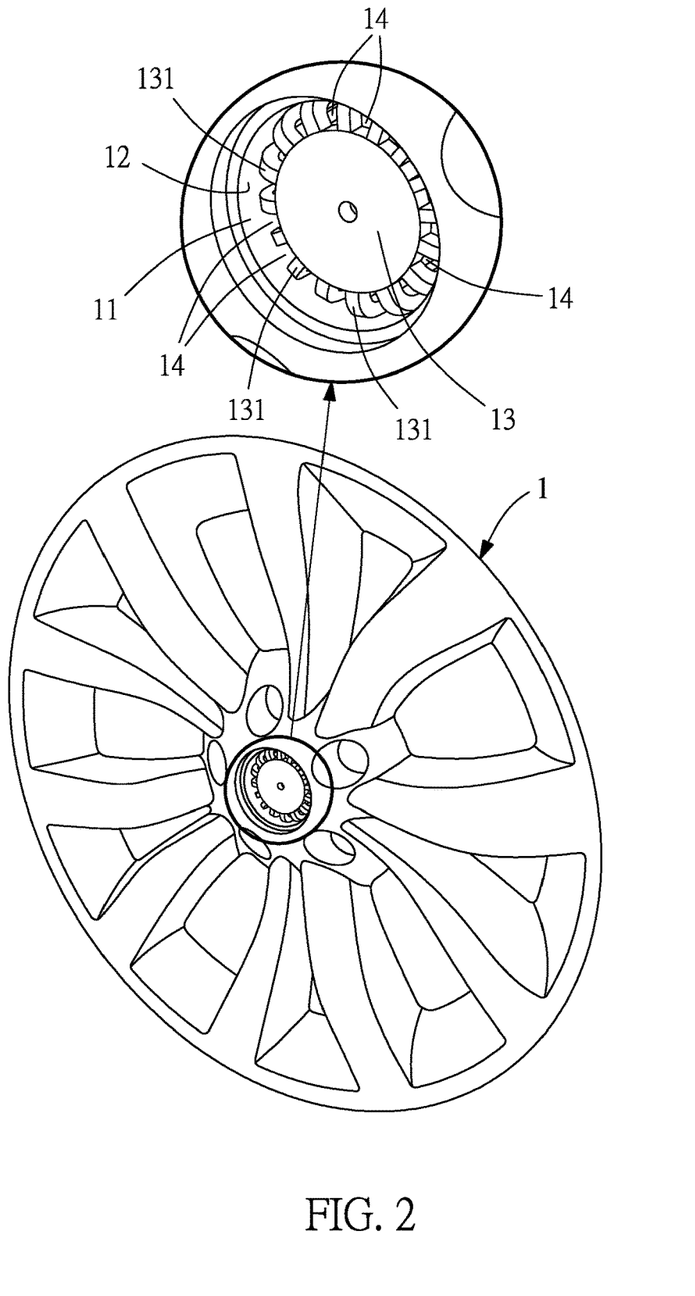
FIG. 2 is a front perspective view of the automobile wheel cover in accordance with the present invention.
Figure 3:
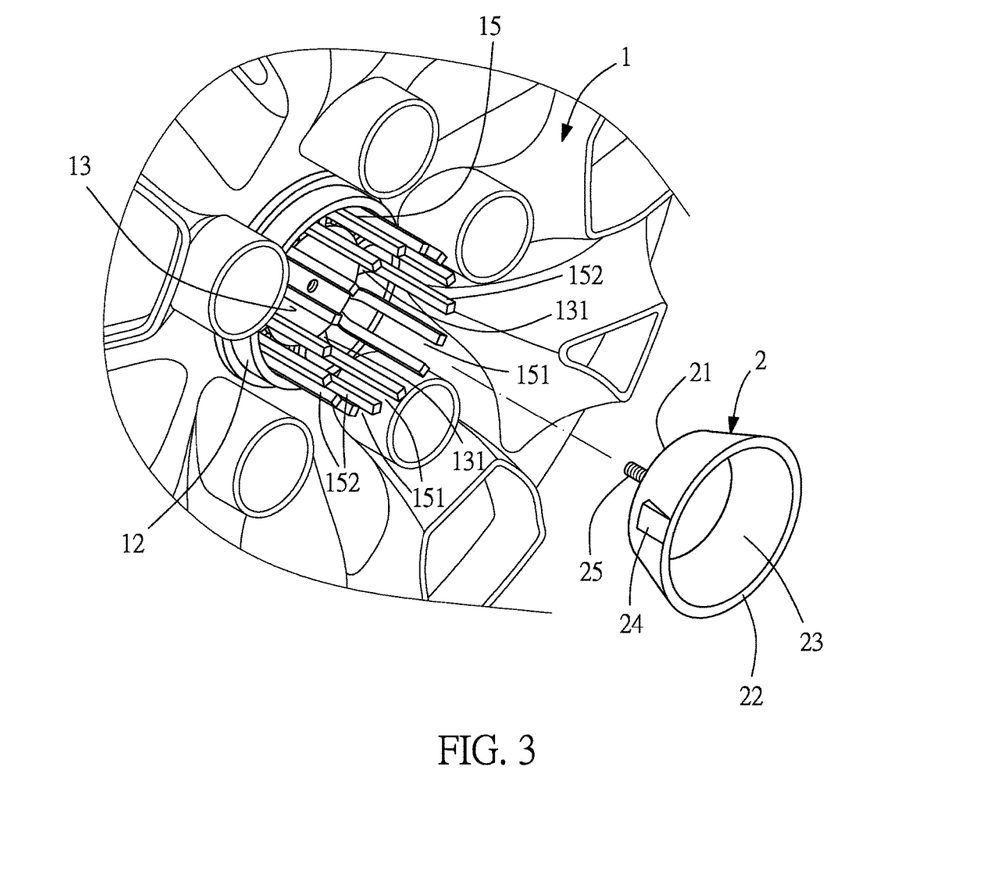
FIG. 3 is a back perspective view of main components of the automobile wheel cover in accordance with the present invention.

As shown in FIG. 2, the automobile wheel cover 1 is made of plastic and defined with a central hole 11, a protruded ring 12 (as shown in FIG. 3) is inwardly extended from an inner side of the central hole 11. The automobile wheel cover 1 is integrally formed with a bearing seat 13 opposite the inner side of the central hole 11, and between the bearing seat 13 and an inner periphery of the central hole 11 is equidistantly defined a plurality of separating holes 14. A plurality of protruded seats 131 is outwardly extended from an outer side of the bearing seat 13 and is connected to the protruded ring 12, such that the separating holes 14 are formed between the protruded seats 131. An annular seat 15 (as shown in FIG. 3) is extended from an inner side of the bearing seat 13 and defined with a plurality of slots 151, and between each two slots 151 is provided an elastic post 152 which is located around the inner peripheral edge of the protruded ring 12. Namely, the annular seat 15 is located around the inner peripheral edge of the protruded ring 12 and extends toward the inner side of the protruded ring 12. The protruded seats 131 extend toward the inner side of the central hole 11 to connect the elastic posts 152 (as shown in FIGS. 2 and 3).

Figure 6:
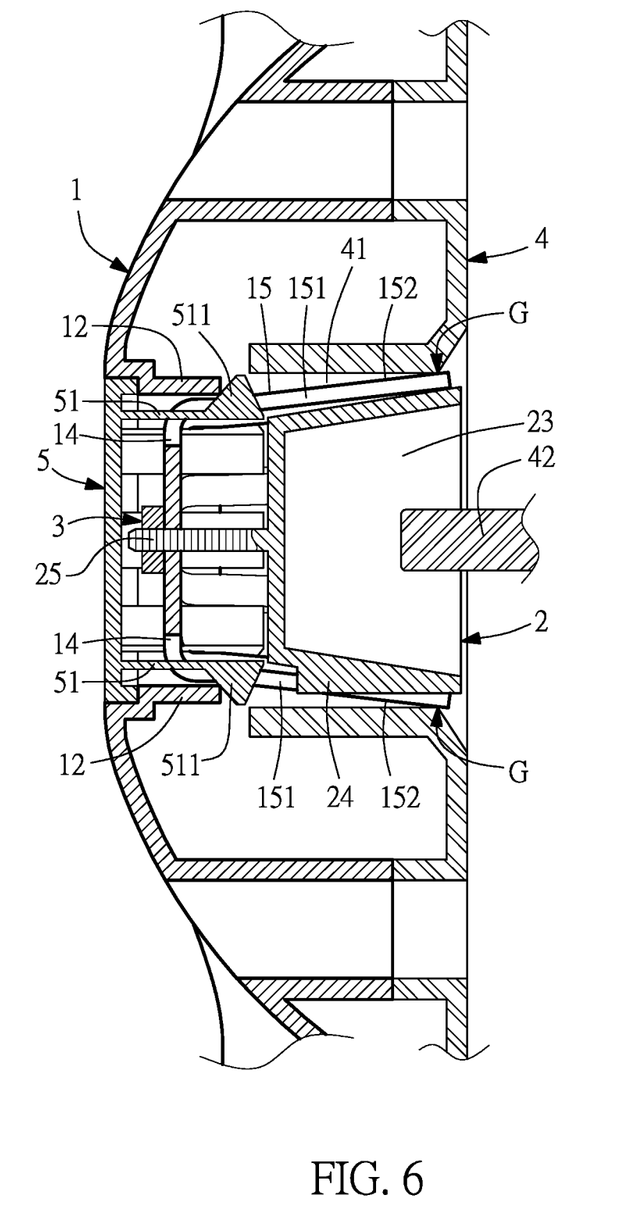
FIG. 6 is a plan view of the main components being assembled with a cover.

The adjusting block 2 is made of plastic and includes a first end 21 and a second end 22 which has a diameter larger than a diameter of the first end 21 (as shown in FIG. 3), that is, the adjusting block 2 has an inclined lateral surface. The adjusting block 2 is defined with a recess 23 which opens toward the second end 22, and has the first end 21 inserted in the annular seat 15. A lateral side of the adjusting block 2 is defined with at least one engaging portion 24 (in the figure, only one engaging portion is illustrated for example) for engaging in one of the slots 151 (as shown in FIG. 6), so that the adjusting block 2 is fixed without rotating. Besides, a screw 25 horizontally extends outward from the first end 21 of the adjusting block 2 and into the bearing seat 13 (as shown in FIG. 4).

Figure 4:
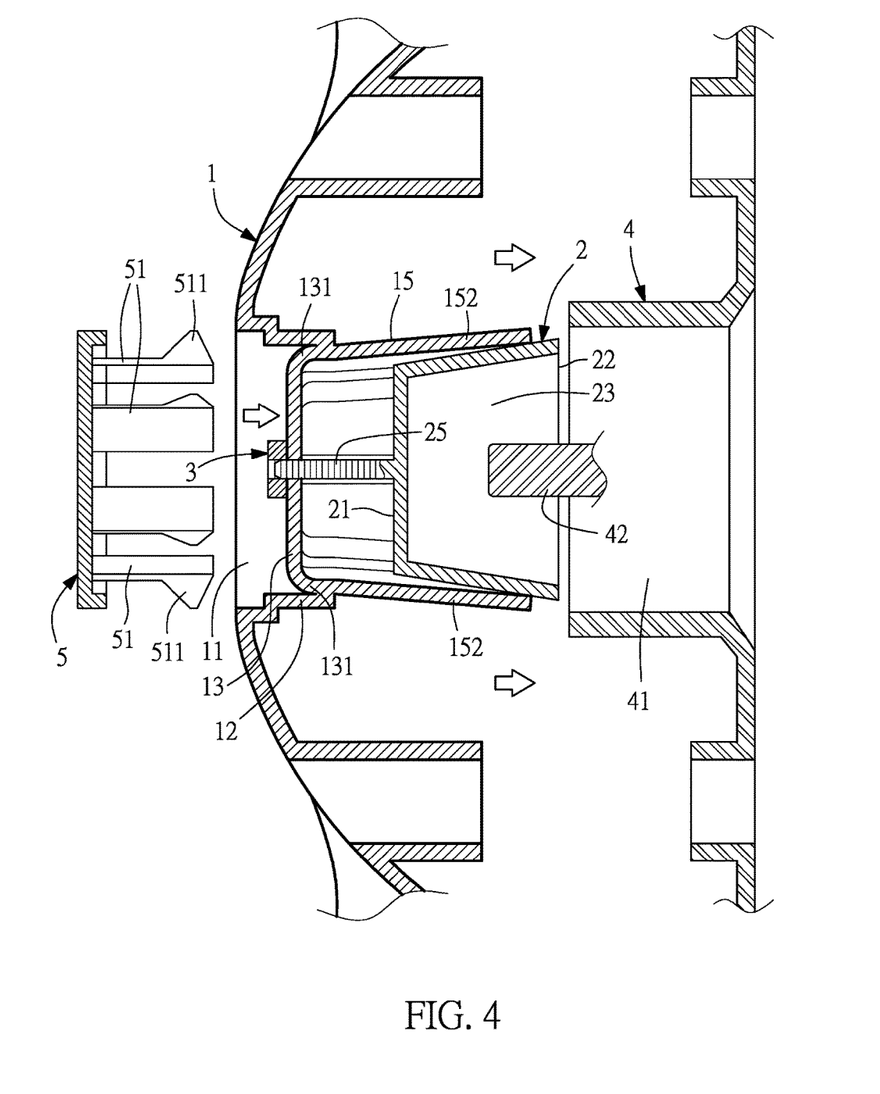
FIG. 4 is a plan view of the composite structure of the main components of the automobile wheel cover in accordance with the present invention.
Figure 5:
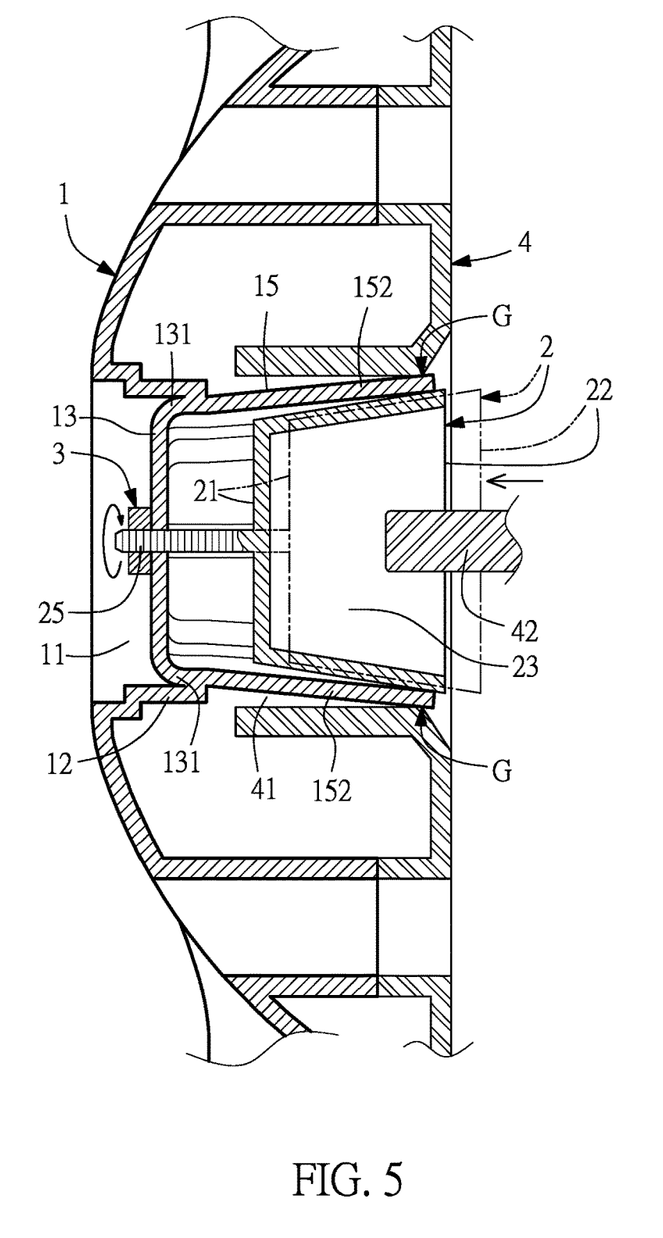
FIG. 5 is an operational view of the main components of the automobile wheel cover in accordance with the present invention.

Referring to FIG. 5, the nut 3 is screwed on the screw 25 and abutted against the outer side of the bearing seat 13 (as shown in FIG. 4, in which only one nut is illustrated). Rotating the nut 3 in one direction can make the adjusting block 2 move toward the interior of the annular seat 15 (as shown in FIG. 5), and the second end 22 will make the posts 152 expand outwardly. Rotating the nut 3 in reverse direction can make the adjusting block 2 move reversely, at that time, the posts 152 will restore their original shape since they are not forced to expand outward anymore by the second end 22.

When assembling, the annular seat 15 of the automobile wheel cover 1 is inserted in a shaft hole 41 of an automobile rim 4 (as shown in FIGS. 4 and 5), then the outer end of the wheel shaft 42 is received in the shaft hole 41. At this moment, rotating the nut 3 can make the posts 152 expand outward to press against an inner surface of the shaft hole 41, and the posts 152 can even be abutted against an inside corner of the shaft hole 41 (as indicated by the point G in FIGS. 6-7). Therefore, the present invention not only improves the connecting between the automobile wheel cover 1 and the automobile rim 4, but also is applicable to the automobile rims 4 with different hole diameters (that is, different brands). Moreover, the automobile wheel cover 1 can be assembled to the automobile rim 4 tightly simply by screwing or releasing the nut 3 to move the adjusting block 2 in or out, which prevents the falling of the automobile wheel cover 1 from the automobile rim 4, and improves driving safety. Besides, the adjusting block 2 is defined with a recess 23, and the wheel shaft 42 of some branded cars protrude too much outward, so that the recess 23 can be provided for accommodation of the outer end of the wheel shaft 42, to prevent interference of the adjusting block 2 with the wheel shaft 42.

Further referring to FIGS. 4 and 6, a cover 5 is inserted in the central hole 11 and is equidistantly and annularly provided in an inner side thereof with a plurality of engaging legs 51. Each of the engaging legs 51 is provided at the front end thereof with an engaging section 511. The engaging legs 51 are inserted through the separating holes 14, and have the engaging sections 511 engaged in the protruded ring 12 and the slots 151 simultaneously. By such arrangements, the cover 5 is assembled in the central hole 11 of the automobile wheel cover 1. The engaging sections 511 of the engaging legs 51 are engaged in the protruded ring 12 and received at the lower end of the slots 151. The engaging portion 24 of the adjusting block 2 is disposed in the slots 151 and does not interfere with the engaging legs 51.

Figure 7:
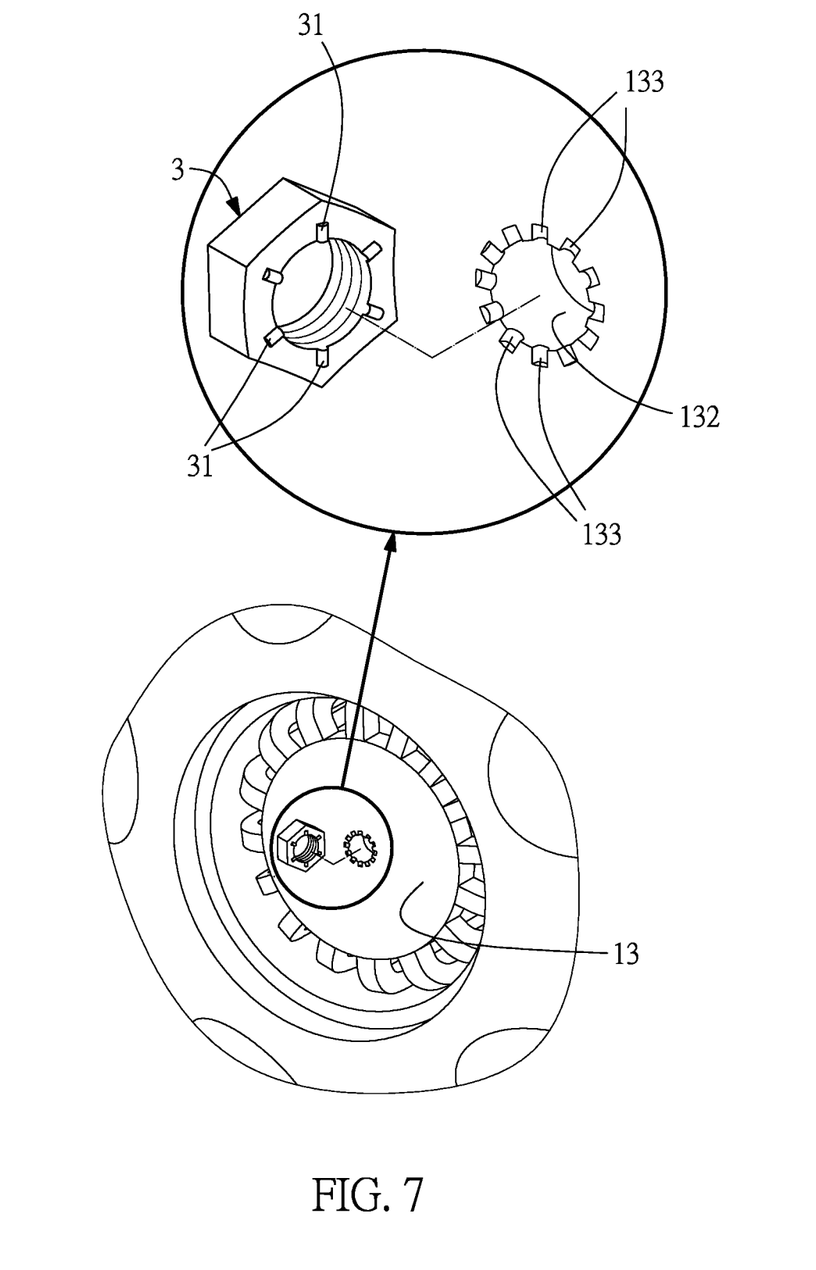
FIG. 7 is a partial exploded view of the automobile wheel cover in accordance with the present invention.
Figure 8:
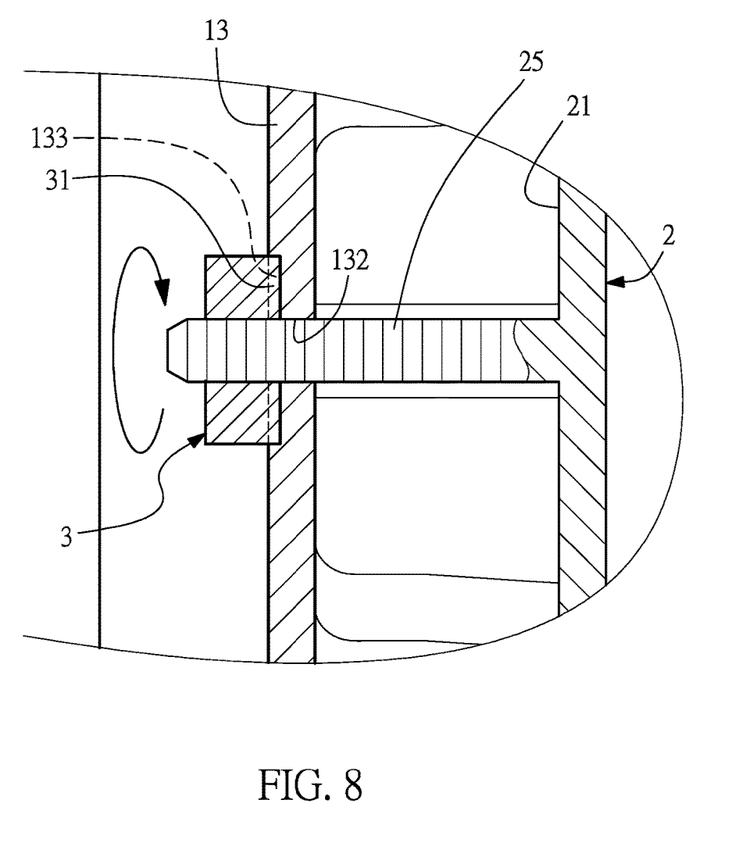
FIG. 8 is an assembly view of FIG. 7.

Referring then to FIG. 7, the bearing seat 13 is further provided with an inserting hole 132 for insertion of the screw 25, and a plurality of arc-shaped grooves 133 (there are 12 arc-shaped grooves as shown in FIG. 7 for exemplary purpose) formed around an outer periphery of the inserting hole 132. A plurality of arc-shaped protrusions 31 (there are 6 arc-shaped protrusions 31 as shown for exemplary purpose) is formed around the inner periphery of the nut 3. When the nut 3 is screwed along the screw 25 and abutted against the outer surface of the bearing seat 13 (as shown in FIG. 8), the arc-shaped protrusions 31 will be engaged in the arc-shaped grooves 133, so that when the automobile rim 4 rotates, the screw 25 won't rotate in a reverse direction to and come loose from the nut 3.

It will be seen from the above-mentioned descriptions that the automobile wheel cover 1 of the prevent invention overcomes the tolerance problem of the shaft holes 41 of the automobile rims 4 of different brands, and will not fall from the automobile rim 4, which can improve the driving safety. Moreover, the cover 5 printed with brand name or logo is engaged in the central hole 11 of the automobile wheel cover 1, which prevents the interference of the adjusting block 2 with the wheel shaft 42, thus overcoming the aforementioned shortcomings of the conventional wheel cover.

While we have shown and described various embodiments in accordance with the present invention, it is clear to those skilled in the art that further embodiments may be made without departing from the scope of the present invention.

What is claimed is:

1. An automobile wheel cover, having a central hole and comprising:
    a bearing seat extended in the central hole, wherein the bearing seat has an outer surface;
    an annular seat extended from an inner side of the bearing seat, wherein the annular seat comprises a plurality of elastic posts, wherein a slot is defined between each two adjacent elastic posts of the plurality of elastic posts;
    an adjusting block including a first end inserted in the annular seat and a second end which has a diameter larger than a diameter of the first end, wherein the second end of the adjusting block has a recess;
    a screw extended from the first end of the adjusting block and inserted into the bearing seat; and
    a nut screwed on the screw and abutted against the outer surface of the bearing seat, thereby rotating the nut renders the second end of the adjusting block to axially move toward an interior of the annular seat to push the elastic posts to radially expand.

2. The automobile wheel cover as claimed in claim 1, wherein a lateral side of the adjusting block is defined with at least one engaging portion for engaging in one of the slots.

3. The automobile wheel cover as claimed in claim 2, wherein between the bearing seat and an inner periphery of the central hole is equidistantly defined a plurality of separating holes, a cover is inserted in the central hole and is equidistantly and annularly provided on an inner side thereof with a plurality of engaging legs, each of the engaging legs is provided at a front end thereof with an engaging section, the engaging legs are inserted through the separating holes, and have the engaging sections engaged in the slots.

4. The automobile wheel cover as claimed in claim 3, wherein a protruded ring is inwardly extended in the central hole, a plurality of protruded seats is outwardly extended from an outer side of the bearing seat and is connected to the protruded ring, such that the separating holes are formed between the protruded seats, the engaging legs are inserted through the separating holes, and have the engaging sections engaged in the protruded ring.

5. The automobile wheel cover as claimed in claim 4, wherein the elastic posts are located around an inner peripheral edge of the protruded ring, and the protruded seats extend to connect the elastic posts.

6. The automobile wheel cover as claimed in claim 4, wherein the bearing seat is further provided with an inserting hole for insertion of the screw, and a plurality of arc-shaped grooves formed around an outer periphery of the inserting hole, a plurality of arc-shaped protrusions is formed around an inner periphery of the nut, the nut is screwed with the screw and abutted against the outer surface of the bearing seat, the arc-shaped protrusions are engaged in the arc-shaped grooves.

* * * * *